Figure 1:
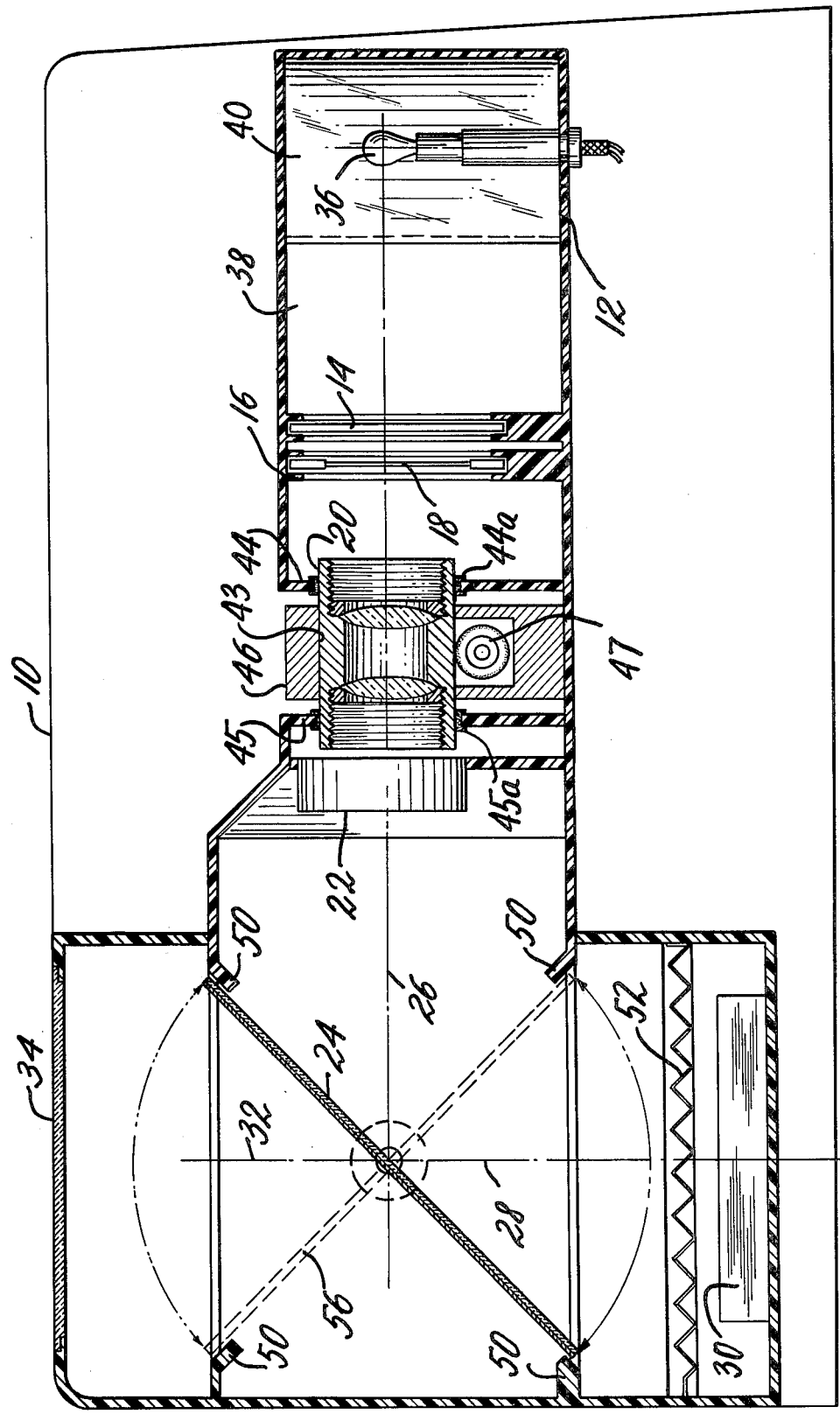

United States Patent [19]

Handsman et al.

[11] 4,184,763
[45] Jan. 22, 1980

[54] SLIDE PRINTING DEVICE

[75] Inventors: Fred B. Handsman, 18-05 215th St., Bayside, N.Y. 11360; Thomas R. Joiner, Los Altos, Calif.

[73] Assignee: Fred B. Handsman, Bayside, N.Y.

[21] Appl. No.: 859,726

[22] Filed: Dec. 12, 1977

[51] Int. Cl.² ............... G03B 27/32; G03B 13/28; G03B 27/54; G03B 27/76
[52] U.S. Cl. .................... 355/27; 355/45; 355/67; 355/71
[58] Field of Search ............... 354/83, 84, 86; 355/44–46, 18, 20, 21, 27, 32, 35, 65, 67, 71, 77, 39

[56] References Cited

U.S. PATENT DOCUMENTS

| 463,630 | 11/1891 | Jenne | 355/67 |
|---|---|---|---|
| 2,256,385 | 9/1941 | Evans et al. | 355/35 |
| 2,493,998 | 1/1950 | Pratt et al. | 355/45 |
| 2,751,814 | 6/1956 | Limberger | 355/28 |
| 2,866,380 | 12/1958 | Bing et al. | 354/83 X |
| 3,065,667 | 11/1962 | Edgerton | 355/27 |
| 3,183,770 | 5/1965 | Nyman et al. | 355/44 |
| 3,270,194 | 8/1966 | Lee | 355/67 X |
| 3,282,183 | 11/1966 | Tuttle et al. | 355/45 X |
| 3,424,527 | 1/1969 | Bremson | 355/46 X |
| 3,451,753 | 6/1969 | Bures et al. | 355/71 X |
| 3,653,760 | 4/1972 | Johnson | 354/105 X |
| 3,689,148 | 9/1972 | Black | 355/39 X |
| 3,697,175 | 10/1972 | Sullivan | 355/39 |
| 3,697,176 | 10/1972 | Kuehnle et al. | 355/45 |
| 3,813,164 | 5/1974 | Skowron et al. | 355/44 |
| 3,831,021 | 8/1974 | Muhlogger | 355/71 X |
| 3,832,725 | 8/1974 | Cook | 354/83 X |
| 3,950,093 | 4/1976 | Schneider | 355/77 X |

FOREIGN PATENT DOCUMENTS

| 818632 | 6/1937 | France | 355/35 |
|---|---|---|---|
| 782422 | 9/1957 | United Kingdom | 355/71 |

Primary Examiner—Donald A. Griffin
Attorney, Agent, or Firm—Brumbaugh, Graves, Donohue & Raymond

[57] ABSTRACT

An apparatus for printing transparencies, such as 35 mm transparencies, onto instant-developing film is disclosed which is suitable for use in the amateur market. The device includes use of short-focal length lenses so that it may be of compact construction, and a previewing mechanism to assure that the image to be printed is in focus.

10 Claims, 2 Drawing Figures

SLIDE PRINTING DEVICE

The present invention relates to a device for producing a print of a transparency, especially 35 mm transparencies.

35 mm photography has achieved widespread popularity. Among the most popular amateur uses of 35 mm photography is in making slides or transparencies which may be preserved and viewed from time to time. Because of the obvious limitations of viewing transparencies, requiring viewing devices with magnifiers, or projectors, there is a need for a convenient method of preparing prints of pictures contained in a 35 mm transparency. Such equipment should be suitable for in-home use by amateurs to allow convenient reproduction of a desired print.

While there are photo-finishing services which provide such prints, these services lack the convenience of a simple device adapted to produce a print at home. Usually, several days are required to obtain a print. With particularly treasured slides, it may be that the photographer is unwilling to risk loss of the slide through leaving it in the care of a photo-finisher. Sophisticated amateur photographers can make prints from the slides. This, however, requires special equipment and darkroom facilities. Convenience prints from slides made in the home, therefore, are not routinely available to the average amateur photographer.

There have been some proposals in the art for equipment to make convenience prints from transparencies. One such proposal appears in U.S. Pat. No. 3,065,667 to Harold E. Edgerton. The Edgerton patent describes a machine primarily intended for commercial application, such as in photographic stores, drugstores, and similar places, where an unskilled patron may insert a desired transparency into the machine and obtain a print of it. The machine employs a strobe flash to illuminate a slide transparency. An image from the transparency is then projected onto a continuous roll of self-developing type of photographic film. However, the device contains no adequate means for previewing the image of which a print is to be made to assure that the image is in good focus and that the print will be made of the desired portion of the original slide. The machine is, moreover, dependent entirely upon the use of strobe flashes to provide the illumination. When projected through a slide, as shown in the U.S. Pat. No. 3,065,667, such illumination is not well suited to instant-print film.

Another device is disclosed in U.S. Pat. No. 3,653,760 to Bruce K. Johnson. The Johnson patent points out the difficulties with equipment for making prints from slides previously available, notably that the previously available equipment is of such high cost as to render it impractical for introduction into the amateur market and, moreover, was optically inadequate. Johnson proposed, therefore, an attachment for use in conjunction with a camera carrying a self-developing type of film. The device is characterized by a folded optical path, including a convex mirror such that a virtual image of a slide or transparency is produced in a location where that virtual image could be focused by means of the "taking" lens of a simple camera. The Johnson device, however, still has drawbacks. Most notably, it depends, for producing the ultimate image to be converted into a print, upon the "taking" lens of a simple camera. A "taking" lens is not designed to produce a good quality image from a nearby subject. Particularly when projecting a slide onto an image plane, a projection lens provides a much more suitable image. Moreover, the Johnson device relies on a flash bulb to provide illumination. Not only is such light variable, but also it is rich in infra-red and ultraviolet light which can seriously alter the color balance if such light is projected onto the film. While it is, of course, common to use both flash cubes and strobe flashes in taking pictures with a simple camera, when used in this manner the light is not in close proximity to the lens since it must travel to the subject, normally at least five feet away, and be reflected back to the lens before reaching the film. When used, however, as a source of illumination for making prints, the light is in very close proximity to the emulsion surface, and because of this close proximity the infra-red and ultraviolet emissions from the light source become a serious problem.

The present invention provides a self-contained mechanism for making prints from transparencies such as 35 mm slides and the like. The equipment comprises, in general, a light-tight enclosure within which are mounted a light source and means for providing uniform illumination from the light source onto the slide to be printed; means for holding the slide to be printed; a focusable projection lens; shutter and exposure control means; previewing means for previewing the projected image to be printed; and means for providing instant developing-type film, such as is marketed commercially by Polaroid, Kodak, and possibly others, in the image plane so that upon exposure the user may withdraw the instantly-developed film and, within a few minutes, obtain a print of the desired slide.

The invention can be better understood by the following drawings in which

Figure 2:
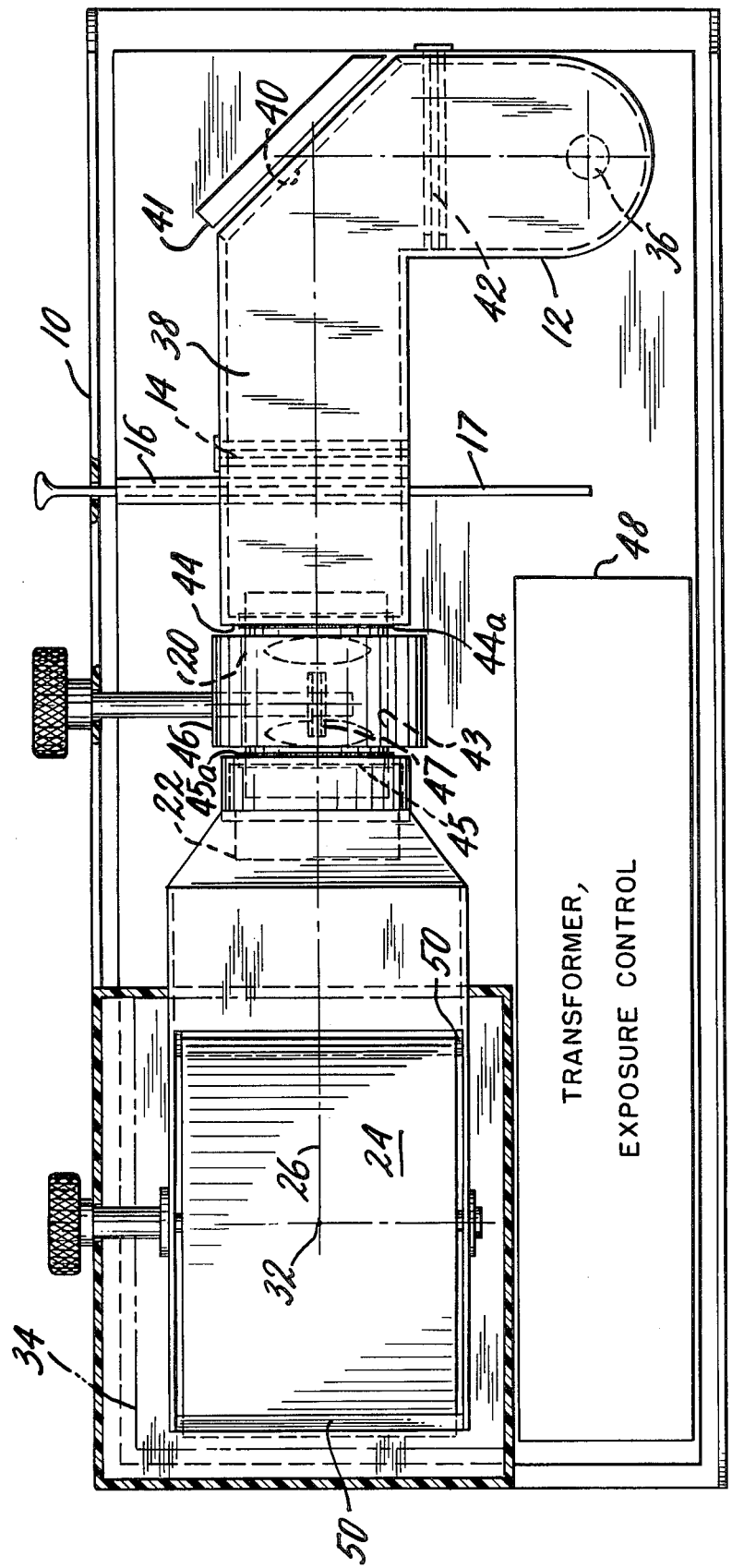

FIG. 1 represents a side view of a slide printing apparatus in accordance therewith, and FIG. 2 represents a top view of the slide printing apparatus of FIG. 1. In FIGS. 1 and 2, similar parts have been similarly numbered.

The slide printer of the present invention is constructed within a self-contained light-tight enclosure 10. Mounted within the enclosure 10 are a light source 12, a diffusing screen 14, a slide carrier 16 holding a slide to be printed, a focusable lens 20, a shutter 22, and a mirror 24, arranged along an optical axis 26. The mirror 24 in the embodiment represented in the drawings is adapted to reflect the optical axis 26 alternately between position 28, so that the image of slide 18 is projected onto a cassette 30 carrying a self-developing film, and a previewing position 32, wherein the image of the slide 18 is projected upon a previewing screen 34 so that the user may preview the slide and ascertain that it is in focus.

Referring more specifically to the light source 12, and diffuser 14, it is necessary that the light source be designed to provide a cool, uniform illumination on a slide mounted in carrier 16. Accordingly, it comprises a lamp 36 mounted at one end of a light mixing chamber 38, chamber 38 terminating at its other end at the diffusing screen 14. The light source 12 and diffuser 14 are shown most clearly in FIG. 2. The lamp 36 is mounted in a position which is not in a direct line of sight to the diffusing screen 14. Mounted at one corner of the mixing chamber is a dichroic mirror 40 which selectively reflects visible light from the lamp 36 toward the diffusing screen 14, but transmits infra-red light to a heat sink 41 which backs the mirror, where the IR is dissipated. The light mixing chamber 38 additionally is preferably provided with a filter drawer 42 in which suitable color correction filters may be inserted as needed. If desired, the light source can be in a direct line with the slide; however, if this is done, suitable infra-red absorption must be provided between the light source and slide.

In printing colored transparencies on ordinary print paper, it is common to provide special filters to absorb both infra-red and ultraviolet light which may otherwise adversely affect the color quality and, in addition, to provide one or two filters (i.e., cyan, yellow or magenta) to correct the color balance of the light source and the slide in relation to the color balance of the print material onto which the print is being made. However, corrections are not normally made by the consumer in the normal usage of instant-print film. The prior art, in attempting to adapt instant-print film to making prints from transparencies, has not given consideration to the importance of ultraviolet absorption and infra-red transmission, or to color correction control. It has been found that these factors are important, and differ between various instant-print films available in the market. Because color balance of instant-development films varies between manufacturers, and even between transparencies of the same manufacturer, provision should be made for varying the color correction filters in filter drawer 42 to match the requirements of particular films and transparencies. If attention is given to color correction filters, any commercially-available instant-development color film can be used in the present invention. The color correction filters should be as far as possible from the slide to be printed to allow thorough mixing of the light from the color correction filters in the light mixing chamber.

The interior surface of the chamber 38 is preferably a reflective material such as Alsac-treated aluminum. This type of aluminum has a highly durable mirror-like finish. Thus, light from the lamp 36 will be reflected by means of mirror 40 and the interior surface of the light source chamber 38, and arrive at the diffusing screen 14 as substantially uniform, well-mixed light. Complete uniformity of light reaching the slide 18 is assured by providing a frosted diffusing screen at 14 mounted closely adjacent to the slide carrier 16. The diffusing screen should also provide ultraviolet absorption if this is not provided elsewhere in the light mixing box.

By providing for a folded optical path within the light source chamber 38, it is possible to insert a dichroic mirror so that infra-red radiation from the light is not reflected to the slide, and also to position the lamp 36 so that it is not in close proximity to the diffusing screen 14 and slide 18. Accordingly, the light arriving at slide 18 is not only diffuse but relatively cool.

The light source 12 as described is particularly suitable for use in printing colored transparencies which require well-diffused light for the best prints. If the transparency printing device of the present invention is to be applied to the printing of black and white slides, an alternate light source may be preferable, particularly if the black and white transparency is a transparency of line figures. In printing projections of line figures, such as writings, drawings and the like, edge sharpness is desired between the "black" and the "white" areas. To provide best results in the printing of such transparencies, it is usually preferred to employ a condensor lens system in the light mixing chamber in place of the diffusing screen illustrated in FIGS. 1 and 2. A condensor lens system will usually provide sharper definition in line drawings between the black and white areas.

The slide carrier 16 is preferably provided with a suitable slide carrier shutter 17 (see FIG. 2) adapted so that when a slide carrier is in the open position, a shutter will block the light path so that light from the diffusing screen will be excluded from the remainder of the slide printing apparatus. Upon inserting a slide into carrier 16, the shutter will open so that the image of the slide will be projected by means of lens 20. While the present invention is described particularly for use in connection with printing 35 mm color transparencies, it is also applicable to other film formats, such as 110 size, 126 size, Minox size, $2\frac{1}{4} \times 2\frac{1}{4}$ size.

As shown in FIGS. 1 and 2, the lens 20 is a multielement lens mounted in a suitable barrel 43 designed to correct for chromatic and spherical abberations. The lens barrel 43 projects through a light baffle 44 forming one end of the light source 12 and through light baffle 45 forming one end of the projection chamber containing the instant print film cassette 30. Appropriate sealing means, such as felting, are provided at the junctures 44a and 45a between the light baffles 44 and 45 and the lens barrel 43 to assure efficient trapping of stray light from the light chamber 12. The lens barrel itself is held in a mounting block 46. Its position is controlled by means of a friction wheel 47 having a suitable control knob. On examining the image projected by lens 20 on previewing screen 34, the user may determine whether the projected image is focused and, if necessary, adjust the focus by means of friction wheel 47. While a friction wheel has been found suitable for use in the present invention, it will be obvious that alternate devices can be used, such as rack and pinion mechanisms, or screw focusing means, to control the position of lens barrel 43.

A feature of the present invention is the use of a short focal length lens 20 for the projection of the image of a slide 18 onto the film carried by cassette 30. It is generally assumed in the photographic industry that for projection purposes, the focal length of the lens should be at least as great as the diameter of the image being projected. Thus, for projecting a 35 mm slide, having a diagonal of 44 mm, the minimum focal length normally used is a lens having a focal length of 50 mm. If such a lens were to be used in the construction of a slide printing device, in order to focus the image of a 35 mm slide in a 3× enlargement, an unreasonably large structure would be required. Accordingly, in the present invention, the focal length of lens 20 is less than the diagonal of the slide for which the device is designed. Preferably, the focal length of lens 20 is less than one-half the diagonal of the slide. By way of illustration, in a preferred embodiment a design for printing 35 mm slides, a lens having a focal length of only 16 mm has been used. With such a focal length lens, however, in order to avoid a vingetting effect, it is necessary to use a large lens diameter. As a rule of thumb, the lens entrance diameter should be not less than the diagonal of the slide being printed. In other words, for a 35 mm slide, I have used a projection lens having an entrance diameter of 50 mm and a focal length of only 16 mm. It will be appreciated that the focal length and entrance diameter of the lens for other film formats will be suitably related to the film size to be printed.

A particular advantage of the present invention is that it permits the use of interchangeable lenses or supplemental lenses. Frequently, in making prints of slides, the user may want to enlarge a portion of the slide and to crop out of the final picture unwanted areas of the original. The slide printing devices previously proposed lacked any ability to control the area of the original slide projected to form the final print. In the present invention, the original lens 20 can be replaced by a shorter focal length lens, or combined with a supplemental lens. The user may then view the enlarged image in viewing screen 34, select the portion of the original transparency which is to be made into a print, and focus that portion. Still greater convenience can be introduced by using a variable focal length lens, i.e., a zoom lens, in lieu of a fixed focal length lens illustrated in FIG. 1.

Mounted beyond the end of lens barrel 43 is indicated a suitable shutter mechanism 22. This shutter mechanism should be designed to exclude light from the chamber in which the film cassette 30 is mounted. A rotating shutter, or other suitable shutter mechanisms may be used. While a manually controlled shutter may be used, it is far preferred in the present invention to provide an automatically- mechanism designed to sense the intensity of the light from lens 20 and adjust the exposure time so that the film of cassette 30 will be properly exposed. By way of illustration, a rotating shutter 22, similar to a focal plane shutter, is mounted across the exit opening of lens barrel 43. The shutter can carry a photoelectric cell such as cadmium sulfide or other similar cells, to measure light intensity. The output of the photosensitive cell is connected to a suitable electronic means, generally indicated at 45, which determines the correct exposure for the particular slide being printed. When the exposure mechanism is triggered, the photoelectric cell adjusts the shutter open time to provide a suitable exposure to the film carried in cassette 30.

If desired for simplicity, a fixed-speed shutter may be employed. In this case, the light intensity transmitted by lens 20 should be controlled by means of a suitable diaphragm in the lens. The diaphragm may be controlled automatically by means of a photoelectric cell such as referred to above and a suitable control mechanism. A manual override may be provided to permit adjustment of the exposure for special affects. If desired, the automatic control mechanism may be omitted and a meter provided to indicate the output of the photoelectric cell. In this case, the exposure is controlled manually by adjusting the lens diaphragm until the meter indicates a light intensity within a predetermined range. In still another embodiment, previewing screen 34 may be provided with a spot (not shown) illuminated with light independent of the image from the slide 18. This separate spot will be of a predetermined and constant brightness. Exposure is then controlled by manually adjusting the lens diaphragm until the brightness of the projected image from the slide approximately matches the brightness of the standard spot. In still another alternative employing a fixed-speed shutter, the light intensity of the projected image can be regulated by means of one or more neutral density filters in the light chamber either associated with diffusing screen 14 or filter drawer 42.

As has already been mentioned, the slide printing device of the present invention is provided with means for previewing the slide to assure focus and to assure that the slide is correctly positioned to print the designed portion of it. For this purpose, the printing device is provided with a rotating mirror 24 designed to reflect the optical axis 26 alternately between position 28 directed to the film cassette and position 32 directed to a previewing screen. To avoid fogging or exposure of the film as a result of light entering through the previewing screen, the mirror 24 should be designed to engage mirror stops 50 in a light-tight fashion so that when mirror 24 is reflecting optical axis 26 to the film cassette 30 for printing a picture, room light entering through screen 34 will not be able to enter past the mirror and affect the film. Additionally, a light shield 52 is provided to block ambient light from inadvertently reaching the film in cassette 30. In the embodiment illustrated in FIG. 1, light shield 52 is normally in a closed position so that light will be unable to reach the film in cassette 30 except when a picture is to be printed. Preferably, the position of light shield 52 will be interlocked with the position of mirror 24 so that it will open only when the shutter mechanism is actuated to make a print. As will be evident, the light shield may, if preferred, be located between mirror 24 and previewing screen 34 rather than where shown in FIG. 1.

For printing 35 mm transparencies in a 3× enlargement, the film cassette 30 will be the standard $3\frac{1}{4} \times 4\frac{1}{4}$ size. However, the manufacturers of the instant development films also commercially supply film in other sizes. For example, Polaroid offers 4×5 and 8×10 sizes. If desired, the cassette 30 may be one of these other sizes with suitable accessories.

It will be recognized that instant development film cassettes usually require various roller arrangements to transport the film and to spread development chemicals contained in capsules distributed on the film as manufactured. The design and disposition of these rollers depends on the design of the film cassette being used. Although not illustrated, it should be understood that the slide printer of the present invention will incorporate suitable rollers adapted to process the film cassette for which the unit is designed.

While the present invention has been described with particular reference to the use of instant-print films for making convenience prints, it may be adapted, if desired, to the use of conventional photographic printing paper. This will necessitate modification of the projection chamber to provide means for holding the printing paper in place, and means for development. Because the development may be handled more conveniently by ancillary equipment, it may be preferred, when using such paper, to have a darkened closet available where the paper can be loaded into the printer, removed, and loaded with the development equipment. This, of course, would result in sacrifice of the convenience of the instant-print film, but can provide improved print quality.

We claim:
1. Apparatus for printing a magnified image of a transparency, said apparatus being enclosed within a substantially light-tight enclosure and comprising:
   a light source defining an optical axis and providing a substantially uniform illumination of said transparency, said light source including means for eliminating a substantial portion of infra-red and ultraviolet rays from said illumination;
   a previewing image plane located laterally of said optical axis for viewing a projected image of said transparency, and a printing image plane located at a position remote from said previewing image plane and laterally of said optical axis, a photographic film being positionable at said printing plane for recording a projected image of said transparency;

a mirror mounted across the optical axis for movement between a previewing position in which it directs an image from the optical axis to said previewing image plane and a print position in which it directs the image from the optical axis to the printing image plane;

a light shield means coupled to said mirror and positioned between the mirror and the printing image plane for preventing light from reaching the printing image plane when the mirror is not in the printing position;

a holding means at a position between the light source and the mirror for holding the transparency transverse to the optical axis;

a lens mounted between the holding means and the mirror so as to project a magnified image of the transparency onto said image planes via said mirror, said lens having a focal length less than the diagonal dimension of the transparency and an entrance diameter larger than the diagonal dimension, the light from the source passing substantially uniformly and exclusively through the transparency and lens so that extraneous light is substantially excluded from the image planes; and shutter means for controlling the transmission of light along the optical path to effectively control the exposure of the photographic film.

2. An apparatus according to claim 1 wherein said photographic paper is an instant-print film and said apparatus includes means for processing and withdrawing the instant-print film from the second image plane after exposure thereof.

3. An apparatus according to claim 1 including means for automatically measuring the brightness of the image transmitted through lens and adjusting the exposure provided by the shutter to provide a substantially-constant exposure to the emulsion mounted at the second image plane (3).

4. An apparatus according to claim 3 wherein said measuring means is mounted on the shutter means.

5. Apparatus according to claim 1 wherein the light source additionally comprises color filter means for color correcting the rays from the lamp, said color filter means being located adjacent said lamp and at some distance from the transparency.

6. Apparatus according to claim 1 wherein said light housing means condenses the light rays from said lamp.

7. Apparatus according to claim 1 wherein said light housing means includes a diffusing screen that diffuses the light rays from said lamp and blocks ultraviolet rays from reaching the transparency.

8. Apparatus according to claim 1 wherein said lens has a focal length less than one-half the diagonal of the transparency.

9. Apparatus according to claim 1 wherein said lens is adapted to have its focal length changed so that only a selected portion of the transparency is previewed at the first image plane and printed on the film at the second image plane.

10. Apparatus for printing a magnified image of a transparency, said apparatus being enclosed within a substantially light-tight enclosure and comprising:

a first housing portion, and a second housing portion extending laterally from said first housing portion, the interior of said first and second housing portions having a highly reflective surface so as to create a light mixing chamber;

a lamp located in said first housing portion at the end remote from its intersection with the second housing portion;

color correction filters located in the first housing portion adjacent said lamp;

a dichroic mirror reflective of visible light and transmitting infra-red light being located at the intersection of the first and second housing portions, said dichroic mirror being arranged for reflecting visible light from the lamp along an optical axis in said second housing and passing infra-red light through said dichroic mirror;

a heat sink on the back of the dichroic mirror for receiving and dissipating the heat of the infra-red light passing through said dichroic mirror;

a diffusing screen located adjacent said transparency along the optical axis and being positioned in the second housing at the end remote from its intersection with the second housing portion, said diffusing screen being adapted to absorb ultraviolet light rays and to provide a substantially uniform illumination source;

a third housing portion in which the optical axis of said second housing portion extends, a previewing image plane being provided in said third housing portion as well as a printing imaging plane displaced from said previewing plane, a photographic film being positionable at said printing plane for recording a projected image of said transparency;

a mirror means mounted across the optical axis in said third housing for movement between a previewing position in which the optical axis is directed to said previewing image plane and a print position in which the optical axis is directed to the printing image plane;

a light shield means associated with said mirror means for preventing light from reaching the printing plane when the mirror means is not in the printing position;

a holding means at a position between the diffusing screen and the mirror means for holding the transparency to be printed transverse to the optical axis;

a lens mounted between the holding means and the mirror means for projecting an image of the transparency onto said previewing and printing image planes, said lens having a focal length less than the diagonal dimension of the transparency to be projected and an entrance diameter larger than the diagonal dimension, said lens being mounted in relation to the transparency and image planes so as to project a magnified image of the transparency onto one or the other of the image planes, the light from said diffusing screen passing substantially uniformly and exclusively through the transparency and said lens so as to substantially exclude extraneous light from the image planes; and shutter means for controlling the transmission of light along the optical path to effectively control the exposure of a photographic film mounted at said printing plane.

* * * * *

UNITED STATES PATENT AND TRADEMARK OFFICE
CERTIFICATE OF CORRECTION

PATENT NO. : 4,184,763
DATED : January 22, 1980
INVENTOR(S) : Fred B. Handsman and Thomas R. Joiner It is certified that error appears in the above-identified patent and that said Letters Patent are hereby corrected as shown below:

First page, Item [75], after "Thomas R. Joiner" insert
    address -- 149 Osage Avenue, Los Altos, Calif.
    94022 --;
Column 4, line 13, "multiele-" should read -- multi-ele- --;
Column 4, line 57, "I" should read -- we --;
Column 5, line 19, after "automatically-" insert
    -- shuttered --;
Column 5, line 31, "photoeletric" should read
    -- photoelectric --;
Column 5, line 41, "affects" should read -- effects --;
Column 7, line 35, after "through" insert -- said --;
Column 7, line 38, delete "(3)".

Signed and Sealed this

Nineteenth Day of August 1980

[SEAL]

Attest:

SIDNEY A. DIAMOND

Attesting Officer     Commissioner of Patents and Trademarks